(12) United States Patent
Lee et al.

(10) Patent No.: US 7,625,111 B2
(45) Date of Patent: Dec. 1, 2009

(54) LIGHT GUIDE DEVICE AND BACK LIGHTING MODULE COMPRISING THE SAME

(75) Inventors: Sang Min Lee, Siheung-si (KR); Seung Ryeol Ryu, Bucheon-si (KR); Seok Jin Kang, Gwangmyeong-si (KR); Jae Ho Cho, Seoul (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 0 days.

(21) Appl. No.: 12/159,680

(22) PCT Filed: Dec. 13, 2006

(86) PCT No.: PCT/KR2006/005428

§ 371 (c)(1),
(2), (4) Date: Jul. 24, 2008

(87) PCT Pub. No.: WO2007/078064

PCT Pub. Date: Jul. 12, 2007

(65) Prior Publication Data

US 2009/0003015 A1 Jan. 1, 2009

(30) Foreign Application Priority Data

Dec. 30, 2005 (KR) ...................... 10-2005-0135033

(51) Int. Cl.
*F21V 8/00* (2006.01)

(52) U.S. Cl. ...................... 362/613; 362/612; 362/621; 362/628

(58) Field of Classification Search ................. 362/611, 362/612, 613, 615, 621, 628
See application file for complete search history.

(56) References Cited

U.S. PATENT DOCUMENTS 5,613,751 A * 3/1997 Parker et al. ................ 362/627

(Continued)

FOREIGN PATENT DOCUMENTS

JP 2001-067919 3/2001

(Continued)

*Primary Examiner*—Laura Tso
(74) *Attorney, Agent, or Firm*—H.C. Park & Associates, PLC

(57) ABSTRACT

A light guide device is used in a back light module that more uniformly mixes different colored light emitted from a plurality of LEDs and transfers the mixed light to a display panel, wherein a light loss can be minimized during the light mixing process and the light can be more uniformly mixed. A light guide device is disclosed for mixing different colored light emitted from a plurality of light emitting diodes (LEDs) and guiding the mixed light to a display panel, wherein the light guide device comprises a light guide portion in the form of a plate arranged at a rear of the display panel; and a light mixing portion formed integrally with the light guide portion and including a light incidence surface adjacent to the plurality of LEDs and a light mixing area for mixing the light with difference colors incident through the light incidence surface.

16 Claims, 3 Drawing Sheets

U.S. PATENT DOCUMENTS

| | | | |
|---|---|---|---|
| 6,164,789 A * | 12/2000 | Unger et al. | 362/610 |
| 7,163,331 B2 * | 1/2007 | Suzuki et al. | 362/610 |
| 2003/0137821 A1 | 7/2003 | Gotoh et al. | |
| 2004/0135936 A1 | 7/2004 | Lee | |
| 2005/0141244 A1 * | 6/2005 | Hamada et al. | 362/612 |
| 2005/0201120 A1 * | 9/2005 | Nesterenko et al. | 362/609 |
| 2005/0265044 A1 * | 12/2005 | Chen et al. | 362/558 |
| 2006/0044831 A1 * | 3/2006 | Yu | 362/615 |

FOREIGN PATENT DOCUMENTS

| | | |
|---|---|---|
| JP | 2002-133932 | 5/2002 |
| JP | 2004-117452 | 4/2004 |
| WO | 02-097324 | 12/2002 |

* cited by examiner

LIGHT GUIDE DEVICE AND BACK LIGHTING MODULE COMPRISING THE SAME

CROSS REFERENCE TO RELATED APPLICATIONS

This application is the National Stage of International Application No. PCT/KR2006/005428, filed on Dec. 13, 2006, and claims priority from and the benefit of Korean Patent Application No. 10-2005-0135033, filed on Dec. 30, 2005, which are both hereby incorporated by reference for all purposes as if fully set forth herein.

BACKGROUND OF THE INVENTION

1. Field of the Invention

The present invention relates to a light guide device for mixing light of various colors and guiding the mixed light to a display panel, and a back lighting module comprising the light guide device.

2. Discussion of the Background

Recently, information communication devices such as computers, mobile phones and portable information terminals are actively developed. In addition, displays, which have been limitedly used for home appliances such as TVs, expand their applications to a variety of electronic devices such as information communication devices. As one of displays used for these electronic devices, a liquid crystal display (hereinafter, referred to as LCD) has been developed. The LCD includes a back lighting module for illuminating a rear side of an LCD panel so that picture images or information can be clearly recognized by a user.

Generally, the back lighting module includes light sources for emitting three kinds of different colored (red, green and blue: RGB) light, a light guide plate for guiding the light toward an LCD panel, and a plurality of optical sheets for controlling the light oriented from the light guide plate to the LCD panel to improve luminance. In addition, as for the light sources of the back lighting module, light emitting diodes (LED) that are friendly to environments and have a superior light conversion property and a long lifespan.

However, since such a back lighting module is constructed such that different colored light emitted from the LEDs are oriented directly to the LCD panel through the light guide plate, there is a problem in that insufficiently and unevenly mixed light is provided to the LCD panel. Particularly, in a case where it is intended to illuminate the LCD panel by using white light obtained by mixing red, green and blue light with one another, the uneven mixing of light becomes an obstruction to implementation of high-quality white light.

In this regard, there has been proposed a back lighting module including a light mixing plate, which is arranged in parallel with a light guide plate, and a reflecting space having elliptical reflective walls at sides of the light mixing plate. Such a back lighting module is disclosed in International Patent Publication No. WO2002/97324. This back lighting module is configured such that different colored light emitted from a plurality of LEDs is mixed by the light mixing plate and then reflected on the reflective walls in the reflecting space to be transferred to a light guide plate which in turn guides the light toward an LCD panel. However, since the light should pass through the reflecting space where air exists while being transferred from the light mixing plate to the light guide plate in the conventional back lighting module, a light loss increases, resulting in degradation of the transfer efficiency of light and thence considerable degradation of the energy efficiency of the LEDs.

SUMMARY OF THE INVENTION

Accordingly, an object of the present invention is to provide a light guide device capable of mixing different colored light emitted from LEDs and transferring the mixed light to a display panel, wherein the colors of light can be more uniformly mixed and a light loss occurring upon mixing of the colors of light can be minimized.

Another object of the present invention is to provide a back lighting module including a plurality LEDs for emitting different colored light and a light guide device for mixing the light emitted from the LEDs and transferring the mixed light to a display panel, wherein the light guide device is constructed such that the colors of light can be more uniformly mixed and there is few light loss during the mixing of the light.

In order to achieve the objects, the present invention provides a light guide device for mixing different colored light emitted from a plurality of light emitting diodes (LEDs) and guiding the mixed light to a display panel, wherein the light guide device comprises a light guide portion in the form of a plate arranged at a rear of the display panel; and a light mixing portion formed integrally with the light guide portion and including a light incidence surface adjacent to the plurality of LEDs and a light mixing area for mixing the light with difference colors incident through the light incidence surface. Thus, when the light guide device of the present invention illuminates a display panel using the different colored light received from the plurality of LEDs, the light guide device can sufficiently mix the different colored light in the light mixing portion. In addition, since the light guide device sufficiently mixes the different colored light with few light loss while the light is transferred from the light mixing portion to the light guide portion, there is an advantage in that the mixed high-quality light can be supplied to the display panel.

According to an embodiment of the present invention, the light mixing portion preferably extends vertically downward from a side of the light guide portion so that the light can be incident through the light incidence surface at a lower end of the light mixing portion. This structure of the light mixing portion allows the light to be sufficiently mixed as much as the downward extending length thereof, and also allows a manufacturer to utilize spaces below the light guide portion and beside the light mixing portion in various ways.

According to another embodiment of the present invention, the light mixing portion preferably extends in a lateral direction from the light guide portion beyond a side of the display panel so that the light can be incident through the light incidence surface at a side end of the light mixing portion. This enhances space utilization by securing a space below the light guide portion, resulting in implementation of a compact display. At this time, it is preferred that a bottom surface of the light mixing portion be slanted toward a bottom surface of the light guide portion, thereby expanding the light mixing area.

According to a further embodiment of the present invention, the light mixing portion preferably includes a plurality of legs having a plurality of light incidence surfaces, and the light mixing area is formed at a position where the legs meet one another. With this structure, the light emitted from the LEDs may be incident into the light mixing portion without a loss.

Meanwhile, the present invention provides a back lighting module for illuminating a display panel, comprising an light emitting diode (LED) array having a plurality of LEDs for emitting different colored light; and a light guide device integrally having a light mixing portion adjacent to the LED array and a light guide portion provided at a rear of the display panel so that the light mixing portion mixes the different colored light with one another and the light guide portion transfers the mixed light toward the display panel.

In the back lighting module of the present invention, the light guide device can be used instead of an existing light guide plate or together with an existing light guide plate below the light guide plate, thereby supplying light with more uniform luminance to an LCD panel.

In addition, in the back lighting module of the present invention, a reflective film or coating is preferably formed on a bottom surface of the light guide device. At this time, in addition to the mixing and guidance of light achieved by internal total reflection, the reflective film or coating can further promote the mixing and guidance of light by the reflection of the film or coating.

With the light guide device and the back lighting module comprising the light guide device constructed as above according to the present invention, different colored light emitted from a plurality of LEDs can be more uniformly mixed and then supplied to an LCD panel, and there is substantially no light loss during the mixing of the different colored light. Therefore, there is an advantage in that light can be more efficiently supplied to the display panel.

In addition, since the light guide device of the present invention is configured to sufficiently mix the different colored light and supply the mixed light to the display panel without any considerable increase in the volume of an LCD, there is another advantage in that a compact display can be implemented.

DETAILED DESCRIPTION OF THE ILLUSTRATED EMBODIMENTS

Figure 1:
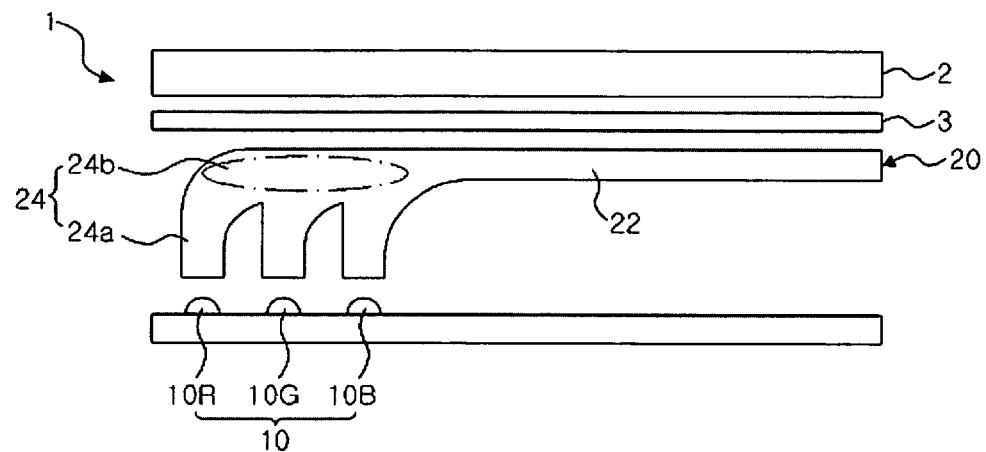
FIG. 1 is a schematic diagram showing a back lighting module according to an embodiment of the present invention together with an LCD panel.

FIG. 1 is a schematic diagram showing a back lighting module according to an embodiment of the present invention together with an LCD panel.

As shown in FIG. 1, the back lighting module 1 of this embodiment comprises an LED array 10 including a plurality of LEDs 10R, 10G and 10B, and a light guide device 20 for receiving and mixing different colored light from the LED array 10 and guiding the mixed light to an LCD panel 2.

In this embodiment, the LED array 10 includes the plurality of LEDs 10R, 10G and 10B for respectively generating red, green and blue (RGB) light. In addition, an LED array of a white light source may also be applied. At this time, the LED array 10 is provided locally at a side portion on a substrate.

The light guide device 20 is an essential feature of the present invention, and functions to receive and mix different colored light from the plurality of LEDs 10R, 10G and 10B and subsequently to guide the mixed light to the LCD panel 2. The light guide device 20 may be made of a transparent material such as soda lime glass, quartz glass, acrylic resin or polycarbonate. In addition, the light guide device 20 includes a light mixing portion 24 adjacent to the LED array 10 including the plurality of LEDs 10R, 10G and 10B, and a light guide portion 22 in the form of a plate arranged in parallel with the LCD panel 2 below the LCD panel 2. The light guide portion 22 and the light mixing portion 24 are integrally formed so that light cannot be substantially lost when the light is mixed and guided, as explained later.

In this embodiment, the light mixing portion 24 extends vertically downward from a side on a bottom surface of the light guide portion 22, and has a plurality of legs 24a corresponding to the plurality of LEDs 10R, 10G and 10B positioned directly below the light mixing portion. The plurality of legs 24a have light incidence surfaces facing the LEDs 10R, 10G and 10B, respectively, so that they can receive red, green and blue light through the light incidence surfaces and then transfer the light to a light mixing area 24b. The light mixing area 24b is formed at a position where the plurality of legs 24a meet one another, so that the different colored light begins to be mixed with one another in this area.

In fact, it is difficult to define a boundary between the light guide portion 22 and the light mixing area 24b of the light mixing portion 24. However, the light mixing area 24b is defined herein as a region where light emitted from the plurality of legs 24a are initially mixed, and the light mixing area 24b is denoted by an imaginary line in the figure.

Meanwhile, the back lighting module 1 of this embodiment further includes a light guide plate 3 directly above the light guide portion 22 of the light guide device 20. The light guide plate 3 receives light upwardly emitted from the light guide device 20, makes the luminance of the light more uniform and then emits the light to the LCD panel 2 again. Although the light guide plate 3 has been described as being used together with the light guide device 20 in this embodiment, it will be apparent that the light guide device 20 can substitute for the function of the light guide plate 3. Although not shown in the drawings, an optical sheet such as a diffusion sheet for uniformly diffusing light and/or a prism sheet for collecting (diffused) light to improve the luminance of the light may be further provided above the light guide portion 22.

The operation of the back lighting module 1 will be described below. First, when power is applied to the LEDs 10R, 10G and 10B that in turn emit red, green and blue light respectively, the emitted light enters the light mixing portion 24 of the light guide device 20 through the respective light incidence surfaces. The light that has entered the light mixing portion 24 begins to be mixed with one another due to internal total reflection in the light mixing area 24b corresponding to an upper area of the light mixing portion 24. In addition, the light travels from the light mixing portion 24 to the light guide portion 22 while being continuously subjected to the internal total reflection, and is then emitted toward the light guide plate 3 above the light guide device 20. Thereafter, the light guide plate 3 causes the light mixed in the light guide device 20 to have uniform luminance and to be subsequently emitted to the LCD panel 2.

In the back lighting module 1, the light is sufficiently mixed in the light mixing portion 24 of the light guide device 20 and then emitted to the LCD panel 2 from the light guide portion 22, thereby enabling the more uniformly mixed light to be supplied to the LCD panel 2. In addition, since the back lighting module 1 of this embodiment is constructed such that the light mixing portion 24 and the light guide portion 22 are integrally formed, it is possible to prevent a light loss that may occur upon mixing of the light. Moreover, since the light mixing portion 24 extends vertically from the bottom surface of the light guide portion 22 in the back lighting module 1, light can be more sufficiently in the light mixing portion 24, and there is an additional advantage in that spaces formed below the light guide portion 22 and beside the light mixing portion 24 may be utilized for installing a variety of additional components.

Figure 2:
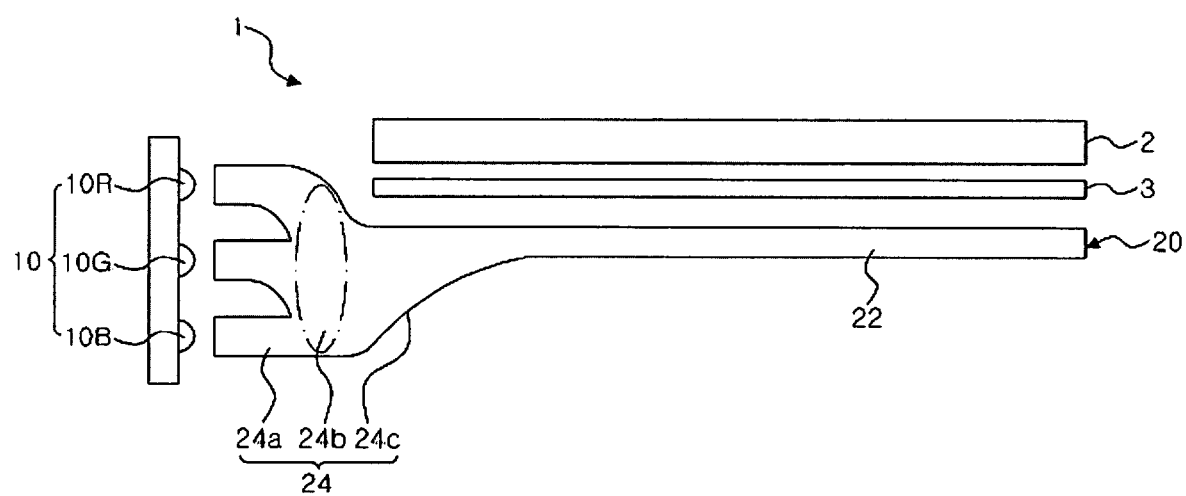
FIG. 2 is a schematic diagram showing a back lighting module according to another embodiment of the present invention together with an LCD panel.

FIG. 2 is a schematic diagram showing a back lighting module according to another embodiment of the present invention.

In the back lighting module 1 of this embodiment shown in FIG. 2, a light mixing portion 24 of a light guide device 20 extends in a lateral direction of a light guide portion 22 of the light guide device 20 beyond a side of an LCD panel 2. At this time, an LED array 10 with a plurality of LEDs 10R, 10G and 10B vertically arranged is installed on a printed circuit board (PCB). The light mixing portion 24 has a plurality of parallel legs 24a, and the plurality of legs 24a are formed by extending in the lateral direction from the light guide device 20. In particular, it can be seen that the uppermost one of the legs 24a is formed above the light guide portion 22 to be placed on the substantially same plane as a light guide plate 3 positioned above the light guide portion 22.

In this back lighting module 1, light emitted from the LEDs 10R, 10G and 10B is received through light incidence surfaces of the legs 24a formed in the light mixing portion 24 and is then mixed in a light mixing area 24b where the legs 24a meet one another, and is subsequently guided to be directed toward the light guide portion 22. In addition, the light guide device 20 of this embodiment further includes an inclined surface 24c leading at an angle from a bottom surface of the light mixing portion 24 to a bottom surface of the light guide portion 22. This inclined surface 24c assists in expanding the light mixing area 24b of the light mixing portion 24, so that the light can be more sufficiently mixed before reaching the light guide portion 22.

Furthermore, since the light mixing portion 24 of the light guide device 20 is formed at the side of the light guide portion 22 beyond the LCD panel 2 in the back lighting module 1, it is possible to reduce a waste of space directly below the LCD panel 2 due to the installation of the light guide device 20. This assists in manufacturing an LCD device in a compact design in spite of the installation of the light guide device 20.

Figure 3:
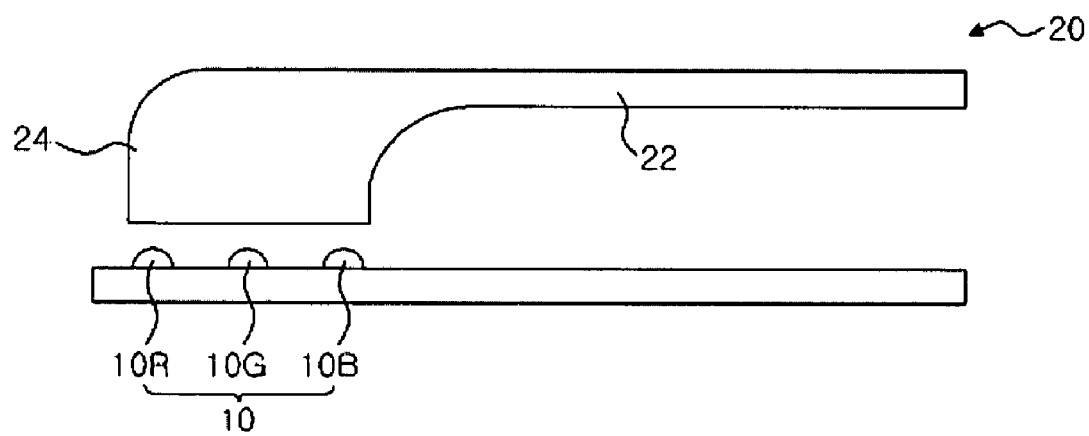
FIGS. 3 to 5 are schematic diagrams showing light guide devices of the back lighting module according to other embodiments of the present invention.
Figure 4:
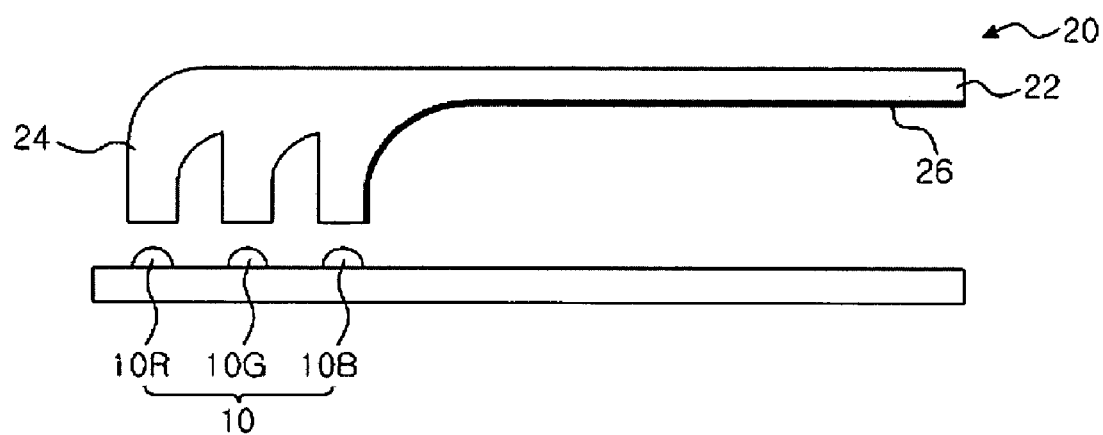
Figure 5:
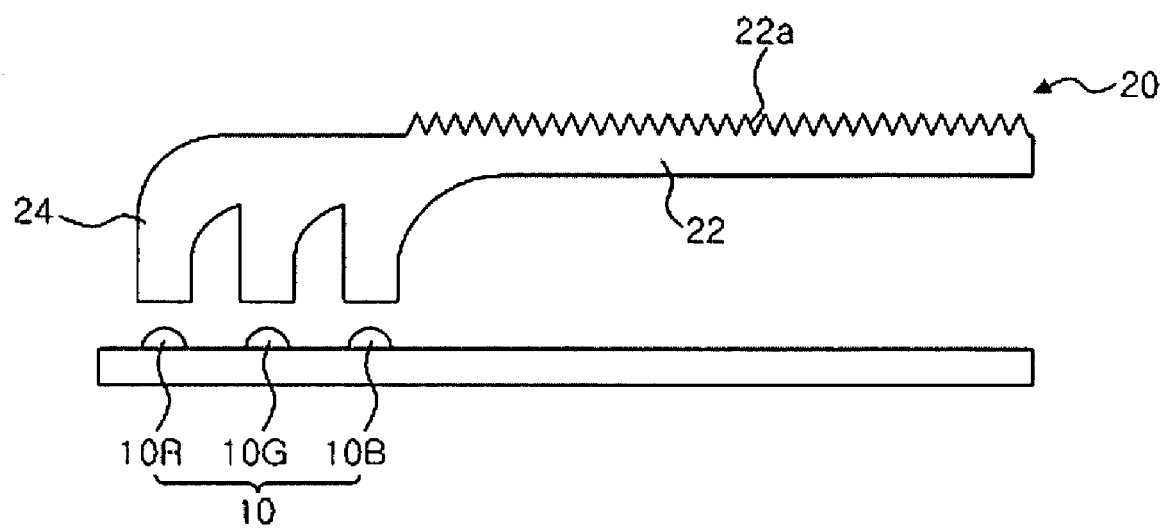

FIGS. 3 to 5 are schematic diagrams illustrating light guide devices according to other embodiments of the present invention.

A light guide device 20 shown in FIG. 3 is different from the previous embodiments in that one light incidence surface positioned at a lower end of a light mixing portion 24 simultaneously receives light emitted from a plurality of LEDs 10R, 10G and 10B without formation of a plurality of legs in the light mixing portion 24. In this case, a light mixing area where the light is mixed becomes the substantially entire area of the light mixing portion 24 except the light incidence surface.

FIG. 4 shows a light guide device 20 having a reflective film or coating 26 formed wholly on a bottom surface of the light guide device. This light guide device has an advantage in that in addition to the mixing and guidance of light achieved by internal total reflection, the reflective film or coating 26 can further promote the mixing and guidance of light.

Furthermore, FIG. 5 shows a light guide device 20 having prism surfaces 22a formed on a front surface of a light guide portion 22. Since the back lighting module is provided with this light guide device 20, the back lighting module can sufficiently diffuse or homogenize light to guide the light to an LCD panel without additional installation of an optical sheet.

Although the present invention has been described in connection with the specific embodiments, various changes, adaptations or modifications can be made thereto within the scope of the invention defined by the appended claims. Thus, the description and drawings should be construed as merely illustrating the present invention rather than limiting the technical spirit of the present invention.

What is claimed is:

1. A light guide device for mixing different colored light emitted from a plurality of light emitting diodes (LEDs) and guiding the mixed light to a display panel, the device comprising:
   a light guide portion comprising a plate arranged at a rear of the display panel; and
   a light mixing portion formed integrally with the light guide portion and including a light incidence surface adjacent to the plurality of LEDs and a light mixing area for mixing the light with different colors received through the light incidence surface,
   wherein a thickness of the light guide portion is less than a thickness of the light mixing portion, and
   wherein the light mixing portion does not contact the plurality of LEDs.

2. The light guide device as claimed in claim 1, wherein the light mixing portion extends vertically downward from a side of the light guide portion so that the light can be received through the light incidence surface at a lower end of the light mixing portion.

3. The light guide device as claimed in claim 1, wherein the light mixing portion extends in a lateral direction from the light guide portion beyond a side of the display panel so that the light can be received through the light incidence surface at a side end of the light mixing portion.

4. The light guide device as claimed in claim 2, wherein the light mixing portion includes a plurality of legs having a plurality of light incidence surfaces, and the light mixing area is formed at a position where the legs meet one another.

5. The light guide device as claimed in claim 1, wherein prism surfaces are formed on a front surface of the light guide portion.

6. A back lighting module for illuminating a display panel, comprising:
   a light emitting diode (LED) array having a plurality of LEDs for emitting different colored light; and
   a light guide device integrally having a light mixing portion adjacent to the LED array and a light guide portion provided at a rear of the display panel so that the light mixing portion mixes the different colored light with one another and the light guide portion transfers the mixed light toward the display panel,
   wherein a thickness of the light guide portion is less than a thickness of the light mixing portion, and
   wherein the light mixing portion does not contact the plurality of LEDs.

7. The back lighting module as claimed in claim 6, wherein a light guide plate is further installed directly above the light guide device.

8. The back lighting module as claimed in claim 7, wherein a reflective film or coating is formed on a bottom surface of the light guide device.

9. The light guide device as claimed in claim 3, wherein the light mixing portion includes a plurality of legs having a plurality of light incidence surfaces, and the light mixing area is formed at a position where the legs meet one another.

10. The light guide device as claimed in claim 1, wherein the light incidence surface is parallel to a surface of the light guide portion.

11. The light guide device as claimed in claim 6, wherein the light incidence surface is parallel to a surface of the light guide portion.

12. The light guide device as claimed in claim 3, wherein an inclined surface connects a bottom surface of the light mixing portion and a bottom surface the light guide portion.

13. The light guide device as claimed in claim 1, wherein the light guide portion and the light mixing portion are arranged in different planes.

14. The back lighting module as claimed in claim 6, wherein the light guide portion and the light mixing portion are arranged in different planes.

15. The light guide device as claimed in claim 4, wherein a surface of the light guide portion faces the display panel, and
wherein the plurality of legs extend in a direction perpendicular to the surface of the light guide portion.

16. The back lighting module as claimed in claim 9, wherein a surface of the light guide portion faces the display panel, and
wherein the plurality of legs extend in a direction parallel to the surface of the light guide portion.

* * * * *